United States Patent Office 2,956,825
Patented Oct. 18, 1960

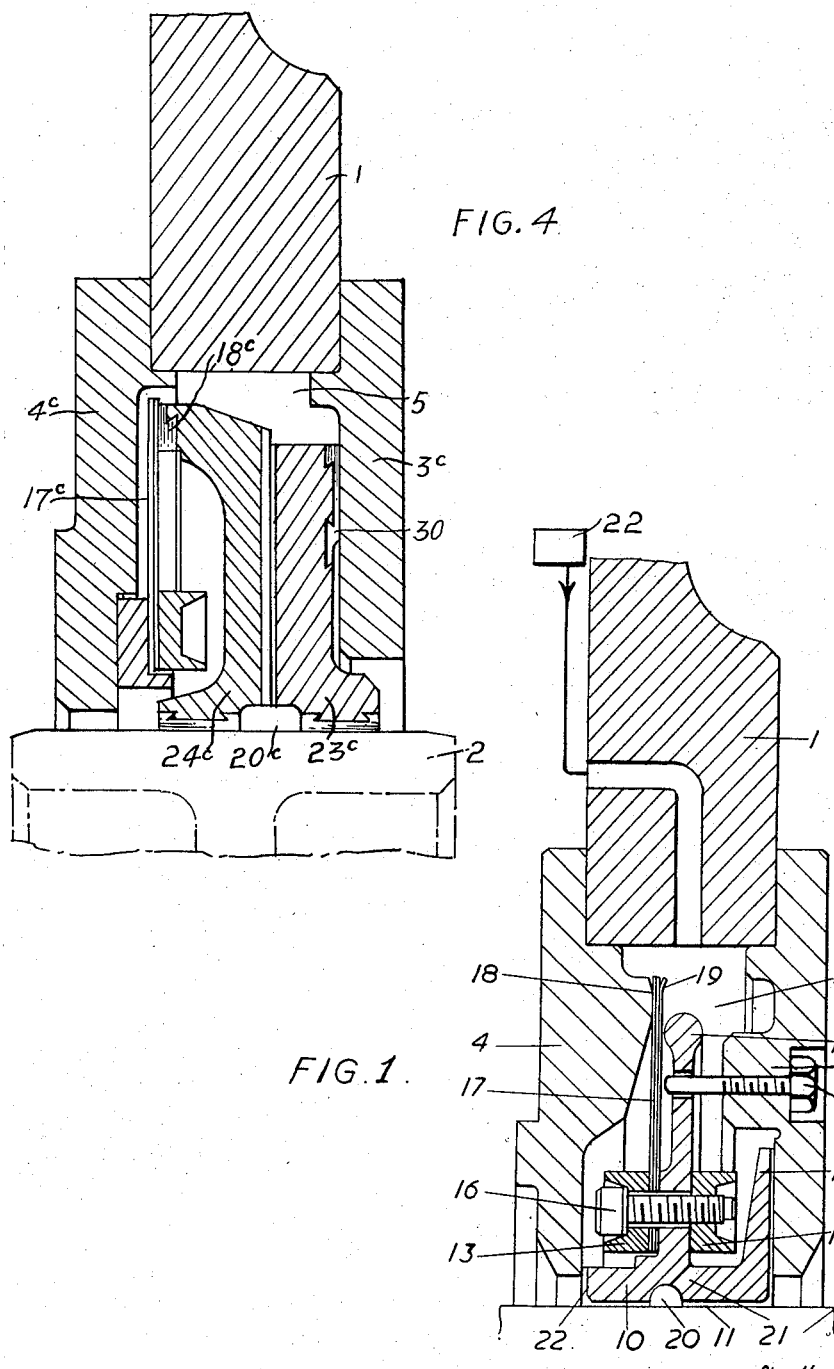

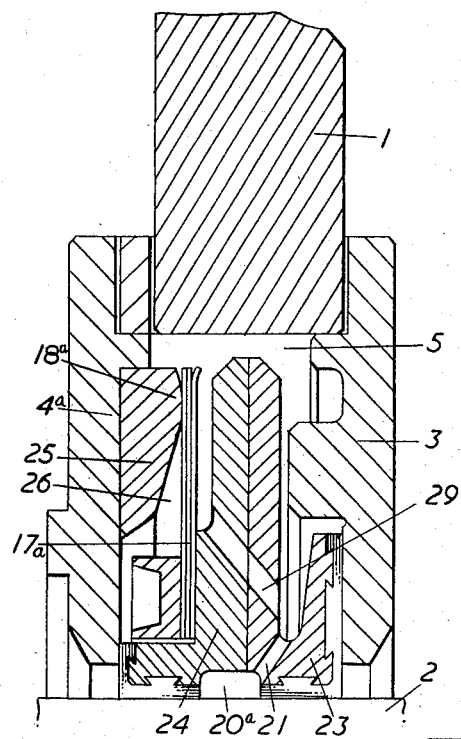
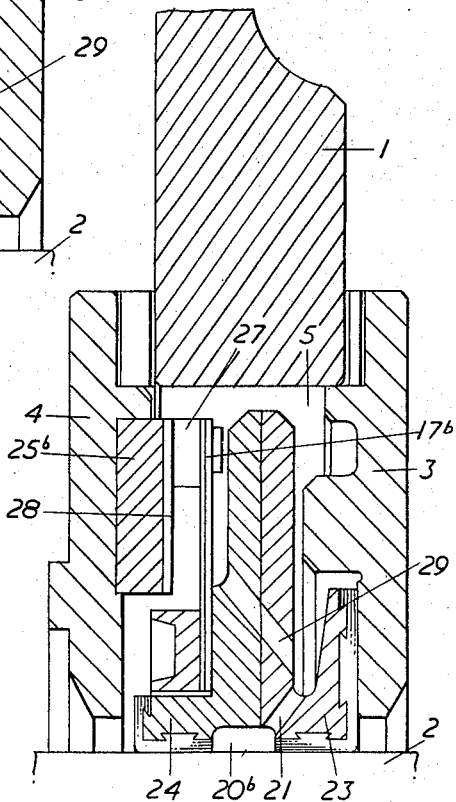

2,956,825
FLUID SEALS FOR SHAFTS

Geoffrey Delafield Hore, Carshalton, and Reginald Thomas Rigelsford, Whitton, England, assignors to D. Napier & Son Limited, London, England, a company of Great Britain Filed May 3, 1954, Ser. No. 427,214

Claims priority, application Great Britain May 8, 1953

8 Claims. (Cl. 286—9)

This invention relates to fluid sealing means for preventing the escape of fluid along a shaft between the shaft and a wall through which it passes and relatively to which it rotates, and is particularly but not exclusively applicable to sealing means for preventing the escape of gas from or the entry of air into the housing of an enclosed gas ventilated machine, such for example as a hydrogen-cooled dynamo-electric machine, along the rotating shaft of the machine, in order to prevent as far as possible loss of the ventilating gas and its contamination with air which, in the case of hydrogen, may produce an explosive mixture.

For convenience, therefore, it will be assumed herein that the shaft rotates and the wall through which it passes is stationary although the invention may be applied in suitable cases to other arrangements in which there is relative rotation between the shaft and the wall.

The invention is concerned with sealing means for the purpose mentioned, of the kind comprising a sealing ring assembly surrounding the shaft with a close working clearance and held from rotation relatively to the wall through which the shaft passes, and means for supplying oil under a suitable pressure to an intermediate point in the length of the ring assembly so that oil flows in opposite directions from such intermediate point along the shaft through the working clearance and thus tends to prevent flow of air or gas in either direction through the seal.

When such a seal is employed between the shaft and the housing of a hydrogen ventilated machine, some air nevertheless tends to be carried into the housing by the oil flowing through the seal while the oil tends to absorb some hydrogen and it is desirable therefore to reduce as far as possible the volumetric rate of oil flow through the seal.

It is an object of the present invention to provide an improved form of seal of the kind referred to which will meet practical requirements to a satisfactory degree.

According to the present invention a fluid sealing device for preventing or minimising the passage of fluid between the two sides of a wall member traversed by a relatively rotatable shaft member (the wall and shaft members being hereinafter referred to for convenience as the rotary members), comprises an annular recess or chamber formed in the wall, and surrounding the shaft, a sealing ring located in the annular recess and encircling the shaft so as to leave a close working clearance therefrom, means for preventing rotation of the sealing ring relative to the wall while permitting at least limited radial and axial movement thereof, sealing means comprising a flexible diaphragm secured to one of the rotary members and an abutment therefor mounted on the other rotary member within the annular recess, the diaphragm thus acting as a fluid partition dividing the annular recess into two pressure chambers, a sealing surface on said ring which cooperates with a part of the wall of the annular recess to provide a substantially fluid-tight seal, which with the diaphragm seal substantially seals one of the pressure chambers, the second pressure chamber being in substantially free communication with the fluid at one side of the wall, means for supplying sealing fluid under a pressure greater than the pressure on either side of the wall to the first pressure chamber so as to urge the diaphragm into engagement with the abutment, and means for supplying sealing fluid also at relatively high pressure through at least one passage in the sealing ring into the working clearance between the ring and the shaft at an intermediate point in the axial length of the ring, such that sealing fluid will flow axially outwards from this point in both directions between the sealing ring and the shaft.

Preferably the second pressure chamber communicates with the high pressure side of the wall.

Moreover in a preferred construction the arrangement is such that the effective differential pressure exerted on the ring in an axial direction acts to tend to move the ring so as to bring its sealing surface into sealing engagement with the wall of the annular recess.

Furthermore the high pressure sealing fluid preferably acts on the diaphragm in a direction to urge the sealing surface of the ring into sealing engagement with the wall of the annular recess.

In some arrangements the flexible diaphragm may itself be resilient and constitute the means for pressing the sealing ring into substantially liquid-tight engagement with the appropriate end wall of the recess, while in other cases separate resilient means may be provided for this purpose or to assist the resilient action of the diaphragm.

The invention may be performed in various different ways but four specific embodiments of the invention will now be described by way of example with reference to the accompanying drawings, in which Figure 1 is a fragmentary sectional view of one form of seal according to the invention.

Figure 2 is a similar view of a modified form in which the abutment for the diaphragm is removable.

Figure 3 is a similar view of a further modification in which the abutment is faced with bearing metal, and Figure 4 is a similar view of a further modification in which the diaphragm is secured to the casing and bears on a part of the sealing ring.

The sealing devices illustrated in Figures 1 to 4 are suitable for use with a hydrogen-cooled dynamo-electric machine such as an electric motor. In each of the illustrated constructions the wall 1 of the electric motor is secured to two annular flanges 3 and 4 encircling but spaced from the shaft 2 and forming between them an annular recess 5. In each case the left hand side of the wall 1 as shown in the drawings is subject to the hydrogen at relatively high pressure while the right side of the wall is open to the atmosphere.

In the construction illustrated in Figure 1 a sealing ring 10 is mounted within the annular recess 5 surrounding and spaced by a close working clearance from the shaft 2. The ring is formed of a material having approximately the same thermal coefficient of expansion as the material of the shaft 2 and the bore of the ring 10 is faced with white metal bearing material 11, thus tending to maintain the clearance constant with temperature changes. A radial flange 12 on the low pressure end of the ring is also faced with white metal and cooperates with the adjacent surface of the flange 3, when the ring is urged towards the low pressure side, to form a fluid seal.

The ring 10 is formed in two semi-circular parts united by parts of arcuate bridge pieces 13 and 14 secured to opposite sides of an outwardly extending radial flange 15 on the ring, the two halves of the ring being bolted together by means of bolts 16 passing through the two bridge pieces. The ring is held against rotational movement by means of three or more bolts 9 (of which one is shown in Figure 1) secured to the flange 3 and passing as a slack fit through holes in the flange 15 of the ring. This locating arrangement permits limited axial and radial movement of the ring, but the clearance between the bolts 9 and the holes is less than the thickness of the white metal 11 so that in the event of the bearing material 11 running out, the ring will be held out of contact with the shaft 2.

Secured to the side of the ring adjacent the high pressure side of the main wall 1 is an annular flexible diaphragm 17 of thin resilient sheet metal. The inner periphery of the diaphragm 17 is preferably clamped between the bridge pieces 13 and the adjacent face of the ring, and the outer periphery of the diaphragm is arranged to seat on an annular abutment 18 formed on an adjacent part of the flange 4 constituting one side wall of the annular recess 5. The resilience of the diaphragm 17 is augmented by a spring disc 19 lying behind the diaphragm and clamped also between the bridge pieces 13 and the ring 10. The spring 19 may be in the form of a series of radial fingers, and acts to urge the outer periphery of the diaphragm towards the high pressure side of the wall 1, that is to say, into engagement with the abutment 18. The spring force thus also provides a component of thrust urging the ring bodily towards the low pressure side of the recess 5.

The bore of the sealing ring 10 is provided with an annular groove 20 approximately at the mid point in its axial length, and preferably slightly closer to the high pressure side. A series of circumferentially spaced drillings 21 in the ring lead from this annular groove 20 to the annular recess 5 on the low pressure side of the diaphragm 17. In Figure 1 the sealing ring 10 is shown as making a close fit with the adjacent surfaces of the flanges 3 and 4 forming the walls of the annular recess 5, but in practice it will be understood that when the flange 12 on the sealing ring 10 is in close sealing engagement with the surface of the flange 3, the radial surface 22 on the high pressure side of the sealing ring will be clear of the adjacent face of the flange 4 and the high pressure hydrogen will therefore be admitted to the chamber formed between the diaphragm 17 and the adjacent face of the flange 4.

Sealing fluid such as lubricating oil, at a pressure greater than the pressure of the hydrogen on the high pressure side of the wall 1 is supplied continuously from a pump 22 driven by the motor to the annular recess 5 and passes through the passages 21 into the annular groove 20 and thence travels outwards in both axial directions between the sealing ring 10 and the surface of the shaft 2. The differential pressures acting upon the diaphragm 17 tend to hold the outer periphery of the diaphragm in close sealing engagement with the abutment 18, and the total balance of pressures acting on the sealing ring 10 combined with the spring thrust of the diaphragm and its associated spring act to urge the sealing ring bodily towards the low pressure side of the recess, so causing the radial flange 12 to make sealing engagement with the adjacent face of the flange 3.

It will be understood that since the sealing ring 10 is capable of limited radial and axial movements it is possible for the clearance between the ring and the shaft 2 to be a minimum, and so to minimise the flow of oil outwards between the ring and the shaft for the reasons referred to above. Moreover the ring can be of rigid construction, thus facilitating its manufacture with desirably small working clearance with the shaft so as to improve the seal and reduce the flow of oil through this clearance. It will also be seen that since the flexible diaphragm provides the necessary seal between one side of the housing and the ring no close control of axial dimentions is necessary.

The sealing device illustrated in Figure 2 is basically similar to that in Figure 1, and similar parts are indicated by the same reference numerals. In this construction however, the sealing ring is built up from two ring elements 23 and 24, arranged side-by-side, each ring element itself being built up from two or more arcuate sectors, the joints between the sectors being staggered so as to provide substantially constant stiffness or rigidity throughout the circumference of the ring. Adjacent sectors of one ring element are rigidly secured to the overlapping sector of the other ring element, and it will be seen that the complete sealing ring will thus remain substantially circular under the thermal stresses occurring during operation. Moreover the ring is formed with through passages 29, through which the oil in the recess 5 circulates, and so assists in maintaining even temperature gradients in the ring.

In all other main respects the construction of Figure 2 differs only in minor design features from that shown in Figure 1, but in Figure 2 the abutment 18a for the diaphragm 17 is formed on a separate detachable abutment member 25, which may therefore be interchanged with abutment members of differing contour (as illustrated in dotted lines at 26, for example) in order to provide appropriate pressure and spring forces on the diaphragm 17a to suit any required operating conditions.

The construction illustrated in Figure 3 is basically similar to that illustrated in Figure 2 but in this case the diaphragm 17b is provided with an annular facing ring 27 of suitable metal and the abutment member 25b is faced with white metal or other anti-friction material 28. This arrangement reduces wear on the face of the diaphragm.

In the construction illustrated in Figure 4, the sealing ring is, as in Figures 2 and 3, built up from two ring elements, 23c, 24c, each of two or more accurate sectors. In this case however the diaphragm 17c is secured at its inner periphery to the inner periphery of the face of the flange 4c adjacent the sealing ring. The outer periphery of the diaphragm bears on an annular abutment 18c of anti-friction material secured to the adjacent face of the sealing ring. The face of the diaphragm 17c adjacent the high pressure side of the wall 1 is in communication with the sealing fluid in the annular recess 5 while the opposite face of the diaphragm is in free communication with the high pressure hydrogen on the high pressure side of the main wall.

In this construction the resilience of the diaphragm need be sufficient only to ensure initial contact at the abutment 18c. Since the pressure of the sealing fluid in the annular recess 5 is always maintained at a value above the hydrogen pressure, the diaphragm will therefore always be urged into sealing engagement with the abutment 18c. It will be understood also that with this arrangement satisfactory operation will be maintained for a wide range of differential pressures across the diaphragm, since the differential pressure will always act to maintain the seal between the diaphragm 17c and the abutment 18c and also the seal between the surface 30 of the ring at the low pressure end of the ring and the adjacent face of the flange 3c.

What we claim as our invention and desire to secure by Letters Patent is:

1. A fluid sealing device to prevent fluid flow in either direction between a rotary shaft and a wall member traversed by said shaft, the wall member being formed to provide an annular recess surrounding the shaft, a single sealing ring only located in the annular recess and closely surrounding the shaft, means for preventing rotation of the sealing ring relative to the wall member while permitting at least limited radial and axial movement thereof, sealing means between the sealing ring and a part of the wall member within the recess comprising a flexible diaphragm, the diaphragm thus acting as a fluid partition dividing the annular recess into two pressure chambers, a sealing surface on said ring which cooperates with a part of the wall of the annular recess to provide a substantially fluid-tight seal, which with the diaphragm seal substantially seals one of the pressure chambers, the second pressure chamber being in substantially free communication with the fluid at the high pressure side of the wall member; means for supplying sealing fluid under a pressure greater than the pressure on the high pressure side of the wall member to the first pressure chamber so as to urge the diaphragm into its sealing position, and means for supplying sealing fluid also at relatively high pressure through at least one passage in the sealing ring into the working clearance between the ring and the shaft member at an intermediate point in the axial length of the ring, such that sealing fluid will flow axially outwards from this point in both directions between the sealing ring and the shaft member.

2. A fluid sealing device as claimed in claim 1 including a resilient spring device acting between the sealing ring and the wall member in a direction to move the ring to bring the sealing surface thereon into sealing engagement with the adjacent wall of the annular recess.

3. A fluid sealing device as claimed in claim 2 in which the resilient spring device acts between the flexible diaphragm and the member to which it is secured.

4. A fluid sealing device as claimed in claim 1 in which the flexible diaphragm is resilient and itself constitutes a resilient spring device acting between the sealing ring and the wall member in a direction to move the ring to bring the sealing surface thereon into sealing engagement with the adjacent wall of the annular recess.

5. A fluid sealing device as claimed in claim 1 in which the effective differential pressure exerted on the sealing ring in an axial direction tends to move the ring to bring the sealing surface thereon into sealing engagement with the cooperating part of the wall of the annular recess.

6. A fluid sealing device as claimed in claim 1 in which the high pressure sealing fluid acts on the diaphragm in a direction to urge the sealing surface of the sealing ring into sealing engagement with the cooperating part of the wall of the annular recess.

7. A fluid sealing device as claimed in claim 1 in which at least one of the contacting parts of the flexible diaphragm and the cooperating abutment on the appropriate member is faced with an anti-friction material.

8. A fluid sealing device as claimed in claim 1 in which the diaphragm is secured at its inner periphery to the inner periphery of the wall of the annular recess adjacent the high pressure side of the main wall member, while the abutment for the outer periphery of the diaphragm is formed on the face of the sealing ring adjacent the high pressure side of the wall member, the arrangement being such that the fluid on the high pressure side of the wall member acts on the face of the diaphragm adjacent the low pressure side of the wall member, while the opposite side of the diaphragm is subject to the high pressure sealing fluid.

References Cited in the file of this patent
UNITED STATES PATENTS

| | | |
|---|---|---|
| 1,846,598 | Hodgkinson | Feb. 23, 1932 |
| 2,246,912 | Baudry | June 24, 1941 |
| 2,622,902 | Malmvik | Dec. 23, 1952 |
| 2,647,771 | Grobel | Aug. 4, 1953 |
| 2,720,404 | Saywell | Oct. 11, 1955 |
| 2,723,867 | Howard | Nov. 15, 1955 |

FOREIGN PATENTS

| | | |
|---|---|---|
| 342,105 | France | June 28, 1904 |
| 652,109 | Great Britain | Apr. 18, 1951 |
| 679,481 | Great Britain | Sept. 17, 1952 |